US007096034B2

(12) United States Patent
Zhang et al.

(10) Patent No.: US 7,096,034 B2
(45) Date of Patent: Aug. 22, 2006

(54) SYSTEM AND METHOD FOR REDUCING POWER CONSUMPTION FOR WIRELESS COMMUNICATIONS BY MOBILE DEVICES

(75) Inventors: Qian Zhang, Hubei (CN); Wenwu Zhu, Basking Ridge, NJ (US); Ya-Qin Zhang, West Windsor, NJ (US); Ji Zhu, Nan Tong Jiang Su (CN)

(73) Assignee: Microsoft Corporation, Redmond, WA (US)

(*) Notice: Subject to any disclaimer, the term of this patent is extended or adjusted under 35 U.S.C. 154(b) by 638 days.

(21) Appl. No.: 09/968,380

(22) Filed: Oct. 1, 2001

(65) Prior Publication Data

US 2003/0064744 A1 Apr. 3, 2003

(51) Int. Cl.
*H04B 7/00* (2006.01)
*H04Q 7/00* (2006.01)

(52) U.S. Cl. .................. 455/522; 455/13.4; 455/68; 455/69; 370/333; 370/332

(58) Field of Classification Search ............. 455/522, 455/69, 70, 67.1, 13.4, 68; 370/333, 332, 370/320, 311
See application file for complete search history.

(56) References Cited

U.S. PATENT DOCUMENTS

| | | | | |
|---|---|---|---|---|
| 5,751,763 A | * | 5/1998 | Bruckert | 375/141 |
| 5,812,938 A | * | 9/1998 | Gilhousen et al. | 455/69 |
| 5,960,039 A | * | 9/1999 | Martin et al. | 375/267 |
| 6,097,763 A | * | 8/2000 | Djokovic et al. | 375/260 |
| 6,154,450 A | * | 11/2000 | Wallentin et al. | 370/311 |
| 6,154,489 A | * | 11/2000 | Kleider et al. | 375/221 |
| 6,301,485 B1 | * | 10/2001 | Lee | 455/522 |
| 6,445,930 B1 | * | 9/2002 | Bartelme et al. | 455/522 |

(Continued)

OTHER PUBLICATIONS

Manish Goel, A Low-power Multimedia Communication System for Indoor Wireless Application, Oct. 1999, 1999 IEEE Workshop on Signal Processing Systems. SiPS 99.*

(Continued)

*Primary Examiner*—George Eng
*Assistant Examiner*—Huy Phan
(74) *Attorney, Agent, or Firm*—Lee & Hayes, PLLC

(57) ABSTRACT

A power control scheme for a wireless network communication system that includes a base station and multiple wireless mobile device dynamically adjusts transmission power of a mobile device in conjunction with adjusting its bit allocation in source coding and channel coding to minimize its total power consumption while maximizing the system capacity in terms of the total effective transmission rates received by the base station. The base station sets a target signal quality value for each mobile station, and the target values are determined by the base station such that the total effective data rate from all the mobile devices is maximized under constraints of the total received power and the error protection level requirements for the mobile devices. The base station periodically measures a signal quality value, such as a signal-to-interference ratio (SIR), from transmissions received by the base from each mobile device, compares it with the measured signal quality value for that mobile device, and sends a control signal instructing the mobile device to increase or decrease its transmission power based on the result of the comparison. When the mobile device receives the control signal, it determines an amount of adjustment to its transmission power by performing a minimum calculation under constraints on the total data distortion and the maximum transmission rate to adjust the parameters for source coding, channel coding, and transmission under the constraints to result in a redistribution of power between the components that provides the minimized total power consumption.

18 Claims, 5 Drawing Sheets

U.S. PATENT DOCUMENTS

| | | | |
|---|---|---|---|
| 6,542,718 B1* | 4/2003 | Kuo et al. | 455/522 |
| 6,549,785 B1* | 4/2003 | Agin | 455/522 |
| 6,711,150 B1* | 3/2004 | Vanghi | 370/342 |
| 6,744,754 B1* | 6/2004 | Lee | 370/342 |
| 6,748,234 B1* | 6/2004 | Agrawal et al. | 455/522 |
| 6,801,759 B1* | 10/2004 | Saifuddin | 455/127.1 |
| 6,876,866 B1* | 4/2005 | Ulupinar et al. | 455/522 |
| 6,879,577 B1* | 4/2005 | Lee | 370/342 |
| 2003/0043732 A1* | 3/2003 | Walton et al. | 370/208 |
| 2004/0266473 A1* | 12/2004 | Tsunehara et al. | 455/522 |

OTHER PUBLICATIONS

Qian, Leiming, et al., "Joint Source-Channel Matching for Wireless Video Transmission", Jun. 30, 1999, pp. 1-7.

Song, T-C, et al., "Comparative Study of Power Control Techniques for Cellular CDMA", *Department of Electrical and Electronic Engineering*, University of Pretoria, 12 pages.

Havinga, Paul, J.M., "Energy Efficiency of Error Correction on Wireless Systems", *IEEE 1999*, pp. 616-620.

Zhang, Qian, et al., "A Power-Optimized Joint Source Channel Coding for Scalable Video Streaming over Wireless Channel", *IEEE 2001*, pp. V-137 through V-140.

Cai, Jianfei, et al., "Robust Joint Source-Channel Coding for Image Transmission over Wireless Channels", *IEEE Transaction on Circuits and Systems for Video Technology*, vol. 10, No. 6, Sep. 2000, pp. 962-966.

Lu, Jianhua, et al., "Joint Source and Channel Coding for Mobile Multimedia Communications", *IEEE 1998*, pp. 1224-1228.

Wang, Xufang, et al., "Performance Analysis of Multiresolution Joint Source-Channel Coding for Mobile Radio Channels with Feedback", *IEEE 2000*, pp. 157-161.

Hagenauer, Joachim, "Channel Coding and Transmission Aspects for Wireless Multimedia", *Proceedings of the IEEE*, vol. 87, No. 10, Oct. 1999, pp. 1764-1777.

Ebert, Jean-Pierre, et al., "Power Saving in Wireless LANs: Analyzing the RF Transmission Power and MAC Retransmission Trade-Off", *in Proc. of European Wireless '99 and ITG Fachtagung Mobile Kommunikation, ITG Fachbericht 157*, Oct. 1999, pp. 187-192.

Ji, Zhu, et al., "End-to-End Power-Efficient Video Communication over Wireless Channels", *Microsoft Research*, China, pp. 1-4.

Belzer, Benjamin, et al., "Joint Source Channel Coding of Images with Trellis Coded Quantization and Convolutional Codes", *Proceedings of the 1995 IEEE International Conference on Image Processing (ICIP '95)*, vol. 2, Oct. 1995, pp. 85-88.

Zhang, Qian, et al., "Energy-Efficient Power Control and Joint Source-Channel Coding for Video Communication over Wireless", Microsoft Research, China, pp. 1-2.

"Channel Optimized Quantization of Images over Bursty Channels", retrieved from http://markov.mast.queensu.ca/image.html on Jun. 1, 2001, pp. 1-3.

"Joint Source-Channel Coding", UCL/TELE, retrieved from http://www.tele.ucl.ac.be/PORJ/JSCC_e.html on Jun. 1, 2001, pp. 1-2.

Appadwedula, Swaroop, et al., "Total System Energy Minimization for Wireless Image Transmission", *Department of Electrical and Computer Engineering*, University of Illinois at Urbana-Champaign, pp. 1-34.

Appadwedula, Swaroop, et al., "Joint Source Channel Matching for a Wireless Communication Link", *Coordinated Science Laboratory*, University of Illinois at Urbana-Champaign, pp. 1-5.

Appadwedula, S., et al., "Efficient Wireless Image Transmission Under a Total Power Constraint", University of Illinois at Urbana-Champaign, 6 pages.

"UMTS Terrestrial Radio Access Network (UTRAN): UTRA FDD; Physical Layer Procedures," (UMTS XX.07 version 1.3.1) (Feb. 1999) *Technical Report, Universal Mobile Telecommunications Systems*, pp. 1-19.

Zhuang, Weihua., "Integrated Error Control and Power Control for DS-CDMA Multimedia Wireless Communications", *Department of Electrical and Computer Engineering*, University of Waterloo, 18 pages.

Kim, Seong-Kim, et al., "Combined Power Control and Transmission Rate Selection in Cellular Networks", *Department of Signals, Sensors and Systems, Royal Institute of Technology*, 1999, pp. 1-5.

Cheung, Chok-Kwan, et al., "A Hierarchical Block Motion Estimation Algorithm Using Partial Distortion Measure", *IEEE 1997*, pp. 606-609.

Qian, Leiming, et al., "A General Joint Source-Channel Matching Method for Wireless Video Transmission", *Coordinated Science Laboratory*, University of Illinois at Urbana-Champaign, pp. 1-10.

Baker, M.P.J., et al., "Power Control in UMTS Release '99", First International Conference on 3G Mobile Communication Technologies, Mar. 27-29, 2000, pp. 36-40.

Lu, Yuming, et al., "Integrating Power Control, Error Correcting Coding, and Scheduling for a CDMA Downlink System", *IEEE Journal on Selected Areas in Communications*, vol. 17, No. 5, Jun. 1999, pp. 978-989.

Zorzi, Michele, "Energy Management in Personal Communications and Mobile Computing", *IEEE Personal Communication Magazine*, vol. 5, No. 3, Jun. 1998, p. 10.

Pan, Wendi, et al., "Complexity-Scalable Transform Coding Using Variable Complexity Algorithms", *Proceedings of Date Compression Conference*, Mar. 28-30, 2000, pp. 263-272.

Minocha, Jayanto., et al., "A Low Power Data-Adaptive Motion Estimation Algorithm", *in Proceedings of the 1999 IEEE 3rd Workshop on Multimedia Signal Processing*, Sep. 13-15, 1999, pp. 685-690.

\* cited by examiner

SYSTEM AND METHOD FOR REDUCING POWER CONSUMPTION FOR WIRELESS COMMUNICATIONS BY MOBILE DEVICES

TECHNICAL FIELD OF THE INVENTION

The present invention relates generally to wireless networks having mobile devices, and more particularly to the reduction of power consumption for wireless communications by mobile devices in a wireless network.

BACKGROUND OF THE INVENTION

Minimizing power consumption is an important key issue for mobile wireless network devices, such as laptop computers, personal digital assistant devices, etc., that are battery-powered. This issue is especially important when multimedia services are provided over the wireless network, since multimedia services are generally data-intensive and continuous. The power consumption of a wireless device comprises computational power for generating the data to be transmitted, and transmission power for sending the data wirelessly. The computational power is typically determined by computational costs for source coding and channel coding. How much power should be spent on transmission and source and channel coding calculations is closely related to another key issue for wireless communications in a system with wireless mobile devices, which is the need to satisfy different quality-of-service (QoS) requirements, such as minimum transmission rates, maximum tolerable delay, maximum tolerable distortion, etc.

Power control and joint source-channel coding (JSCC) are two effective approaches for supporting quality-of-service requirements for wireless communications, especially when the communications involve the transmission of multimedia data. Power control is performed from a group point of view by controlling transmission power and spreading gain (transmission rate) of the wireless devices in the group. Most power control schemes are designed to achieve goals such as guaranteeing the low bound of signal-to-interference ratio (SIR), balancing received power levels, or maximizing cell capacities. On the other hand, joint source-channel coding is performed by individual mobile devices by introducing redundancy through channel coding to combat transmission errors. Most existing JSCC schemes are designed to minimize data distortion. To date, the techniques of power control and JSCC have been studied separately, and few of them are concerned with the power consumption of mobile devices.

Accordingly, it is desirable to provide an effective scheme for a wireless system that minimizes the power consumption of individual wireless mobile devices while maintaining desired quality of services of the wireless communications.

SUMMARY OF THE INVENTION

In view of the foregoing, the present invention provides a control scheme for a wireless system that includes a base station communicating with multiple wireless mobile devices. The control scheme dynamically reduces the transmission power of each mobile device in conjunction with adjusting bit allocation in source coding and channel coding performed by that mobile device to minimize its total power consumption, while maximizing the system capacity in terms of the total effective transmission rates of the system. The base station sets a target signal quality value (i.e., a target value of a signal quality parameter, such as the signal-interference ratio (SIR)), for each of the mobile stations. The target signal quality values for the mobile stations are determined by the base station to maximize the total effective data rate of received wireless transmissions from all the mobile devices under constraints of the total received power and error protection levels required by the mobile devices. The target signal quality values are dynamically adjusted in that when the error protection levels of the mobile devices change, the base station recalculates the target signal quality values for the mobile devices.

For each of the mobile devices, the base station periodically measures a signal quality value from transmissions received from that mobile device, and compares the measured signal quality value with the target signal quality value for that device. Based on the result of the comparison, the base station sends a control signal instructing the mobile device to increase or decrease its transmission power.

When the mobile device receives the control signal from the base station, it determines an amount of adjustment to the transmission power by performing a minimization calculation under constraints on the total data distortion and the maximum transmission rate to reallocate power between components for source coding, channel coding, and transmission to provide minimum total power consumption. When the redistribution of power results in a new requirement of error protection level, the mobile device sends a pilot information packet containing the new requirement and transmits the pilot information to the base station.

BRIEF DESCRIPTION OF THE DRAWINGS

While the appended claims set forth the features of the present invention with particularity, the invention and its advantages may be best understood from the following detailed description taken in conjunction with the accompanying drawings, of which:

DETAILED DESCRIPTION OF THE INVENTION

This invention operates in the environment of a wireless network in which a plurality of mobile devices communicates with one or more base stations via wireless links. The mobile device each has a power source, such as a battery pack or the like, that has a limited amount of energy stored therein. Due to the limited energy available from the power source, it is desirable to minimize the power consumption by each mobile device for wireless communications to obtain a longer battery lifetime.

The invention may be implemented in a system employing various types of machines, including cell phones, handheld devices, wireless surveillance devices, microprocessorbased programmable consumer electronics, and the like, using instructions, such as program modules, that are executed by a processor. Generally, program modules include routines, objects, components, data structures and the like that perform particular tasks or implement particular abstract data types. The term "program" includes one or more program modules.

Figure 1:
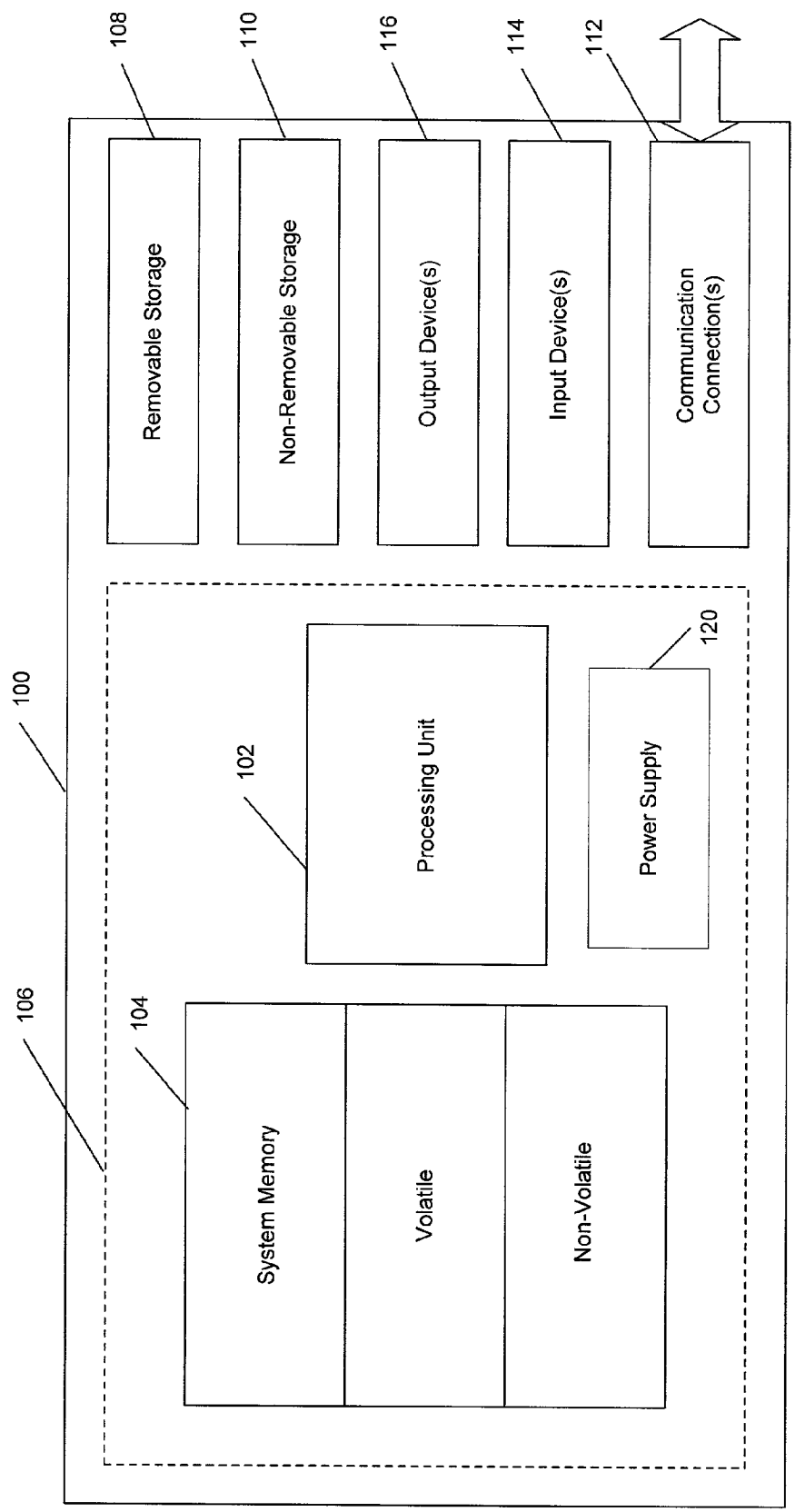
FIG. 1 is a schematic diagram illustrating a computer device architecture upon which embodiments of the invention may be executed.

FIG. 1 shows an exemplary computing device 100 for implementing embodiments of the invention. In its most basic configuration, the computing device 100 typically includes at least one processing unit 102 and memory 104. Depending on the exact configuration and type of computing device, memory 104 may be volatile (such as RAM), non-volatile (such as ROM, flash memory, etc.) or some combination of the two. This most basic configuration is illustrated in FIG. 1 by dashed line 106. Additionally, the device 100 may also have additional features/functionality. For example, the device 100 may also include additional storage (removable and/or non-removable) including, but not limited to, magnetic or optical disks or tape. Such additional storage is illustrated in FIG. 1 by removable storage 108 and non-removable storage 110. Computer storage media includes volatile and nonvolatile, removable and non-removable media implemented in any method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CDROM, digital versatile disks (DVD) or other optical storage, magnetic cassettes, magnetic tape, magnetic disk storage or other magnetic storage devices, or any other medium which can be used to store the desired information and which can accessed by the device 100. Any such computer storage media may be part of device 100.

The device 100 may also contain one or more communications connections 112 that allow the device to communicate with other devices. Communications connections 112 are an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. As discussed above, the term computer readable media as used herein includes both storage media and communication media.

The device 100 may also have one or more input devices 114 such as keyboard, mouse, pen, voice input device, touch-input device, etc. One or more output devices 116 such as a display, speakers, printer, etc. may also be included. All these devices are well known in the art and need not be discussed at greater length here.

In keeping with the intended application of the invention, the device 100 may be used as a wireless mobile device. To that end, the device 100 is provided with a portable power source 120, such as a battery pack or the like. The power source 120 provides power for computations and wireless data transmissions by the device 100.

Figure 2:
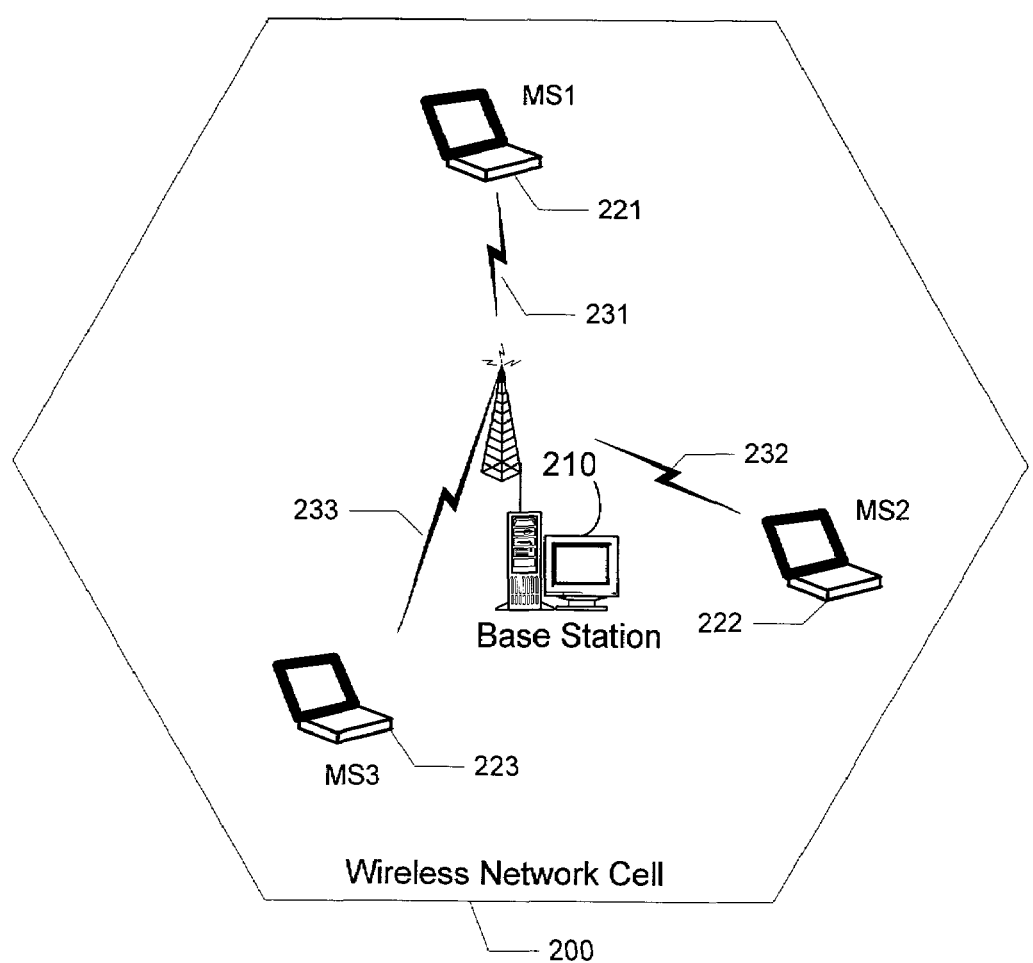
FIG. 2 is a schematic diagram showing a wireless system having a base station and a plurality of mobile devices forming a wireless network cell.

Turning now to FIG. 2, the present invention is directed to a power control scheme for use in a wireless network with a plurality of mobile wireless devices. Current wireless technology typically divides the entire wireless network service area into wireless network cells, each of which is able to topologically map the entire service area. An exemplary wireless network cell in which an embodiment of the invention may be implemented is illustrated in FIG. 2. The cell 200 comprises a base station 210, and a plurality of mobile devices. For illustration purposes, FIG. 2 shows three mobile devices 221, 222, and 223. The mobile devices communicate with the base station 210 via respective wireless links 231, 232, and 233.

In this basic wireless cell configuration, the base station 210 manages communications and may provide multimedia services to the mobile devices, and the mobile devices register with the base station and receive services from the base station. Each mobile device may transmit data, such as multimedia data including audio, images, and video, to the base station. The wireless link between the base station and each mobile device has its associated quality-of-service (QoS) requirements.

The total power consumed in a mobile station consists of transmission power and computational power for generating the data bits to be transmitted wirelessly. The transmission power consumed for transmitting data wirelessly may be measured by the bit energy ($\epsilon_b$), the total bit rate of the transmission, and the efficiency of the power amplifier. The computational power is mainly determined by computational costs for source coding and channel coding. In order to decrease the transmission power while maintain the quality-of-service requirements of the wireless link, compression algorithms can be applied for source coding to reduce the transmission rate. In the mean time, more powerful channel coding schemes can also be used to lower the bit energy and reduce the protection bits. Nevertheless, the processing power consumptions of source coding and channel coding increase as the calculations become more complicated, offsetting the saving in transmission power. Furthermore, both transmission power and computational power control should be adapted to the time-varying wireless channel conditions, which may cause fluctuations of the received signal properties, such as signal amplitude or signal power. The fluctuations of the received power, known as fading, can be the result of several distinct phenomena that characterize wireless channels, such as multi-path transmission, Doppler spread, and shadowing. When only power control is used to counteract the channel fading, this technique ensures a constant bit rate, but requires a large amount of the transmitted power to compensate for deep channel fades. On the other hand, rate control maintains a constant received $E_b/N_0$ (or bit-error-rate (BER)) by adapting the data rate relative to the channel fading such that the mobile device transmits at high rates under favorable channel conditions and responding to channel degradation by reducing data rates, while the transmit power is held fixed. As discussed in prior art, to achieve the same average information rate, the transmission power of the mobile device can be reduced by a factor of the power gain when rate control is used, as compared to the one when power control is used.

The control scheme of the invention attempts to minimize the total power consumption of each mobile device, and to maximize the system capacity in terms of the total effective transmission rate of the multiple mobile devices supported by the base station, while satisfying quality-of-service requirements of the wireless links between the mobile devices and the base station. To that end, this scheme simultaneously performs power control and rate control to obtain the minimal total power consumption of all users in a cell. Different from most JSCC schemes designed to minimize the distortion, the scheme of the invention minimize the total power by allocating the total rate between source and channel.

This control scheme is based on the cooperation of the base station and each of the mobile devices. As described in greater detail below, the base station sets target values of a signal quality parameter for the mobile devices. The term "signal quality parameter" as used herein means a parameter that is indicative of the quality of the signal received from a given mobile device in the presence of noise in the environment and interference (which may also be viewed as a form of noise) with signals from other sources. The signal quality parameter may be, for example, the signal-interference ratio (SIR), the signal-interference-noise ratio, bit error rate, or other variables indicative of the quality of signal reception. In a preferred embodiment described below, the signal quality parameter is the signal-interference ratio. The signal quality targets are set to maximize the total effective transmission rate (i.e., system throughput) under constraints on the signal quality imposed by the quality of service (QoS) requirements for the mobile devices and a constraint on the maximum total received power.

During the course of communicating with the mobile devices, the base station dynamically adjusts the target values of the signal quality parameter for the mobile devices. When the base station receives information from a mobile device indicating a change of error protection requirements in that mobile device, the base station recalculates the target values of signal quality for all the mobile devices through the maximization process. In one embodiment, the information of changed error protection level is in the form of a pilot information packet from the mobile device. The timing for the base station to recalculate the target values can be flexible. In one embodiment, the base station is scheduled to determine whether to reset the target values periodically, such as every 0.666 milliseconds. The base station is, however, not required to reset the target values at the end of each interval. For instance, if the base station is busy and does not have the capacity to perform the maximization calculation for resetting the target values, it may postpone the calculation until the next interval. Also, if none of the mobile devices has changed its error protection level since the last time the target signal quality values for the mobile devices were set, there is no need for the base station to change those values.

Having set the target values for the signal quality parameter for the mobile devices, the base station periodically compares the target value of the signal quality parameter for each mobile device with the measured value of the signal quality parameter for that mobile station. Based on the result of the comparison, the base station sends a control signal to instruct the mobile station to increase its power if the measured value is lower than the target value, and to decrease its transmission power if the measured value is higher than the target value.

In response to the control signal, the mobile device adjusts its transmission power. In accordance with a feature of the invention, the amount of the adjustment to the transmission power is not a fixed step but rather is adaptively determined to minimize the total power consumption of the device under constraints on the total tolerable data distortion and maximum total effective transmission rate. As described in greater detail below, the total power consumption of the mobile device includes transmission power and computational power, and the computational power includes a source coding component and a channel coding component. The minimization process includes adjusting parameters for source coding, channel coding, and transmission, such as bit transmission energy, source rate, and channel rate, to vary these power consumption components to arrive at a minimum total power consumption under the given constraints. If the calculated amount of adjustment to the transmission power is non-zero, the mobile device changes its transmission power by that amount and also applies the bit-reallocation to the source coding rate and channel coding rate according to the result of the minimization calculation. In addition, if the redistribution of power components results in a change in the required error protection level, the mobile device notifies the base station, such as by means of a pilot information packet, of the changed error protection level. After receiving the information about the changed error protection levels from the mobile devices in its cell, the base station recalculates the target values of signal quality for the mobile devices. It should be noted that a non-zero amount of transmission power adjustment does not always indicate that the error protection level is changed. Given a certain end-to-end distortion requirement, if the transmission power is increased, which caused the BER of the connection between mobile device and base station to decrease, the mobile device can either decrease the error protection level or increase the source coding rate. The final decision is based on the minimum power consumption requirement. Similarly, if the transmission power is decreased, the mobile device can either increase the error protection level, or decrease the source coding rate to achieve the minimum power consumption.

This control scheme is described in greater detail with reference to the embodiment of FIG. 3, which illustrates how the base station interacts with one of the mobile devices in the cell of the base station. In this embodiment, as described in greater detail below, the signal quality parameter used by the base station in the control scheme is the signal-interference ratio (SIR). It will be appreciated, however, that other types of signal quality parameters may be used.

Figure 3:
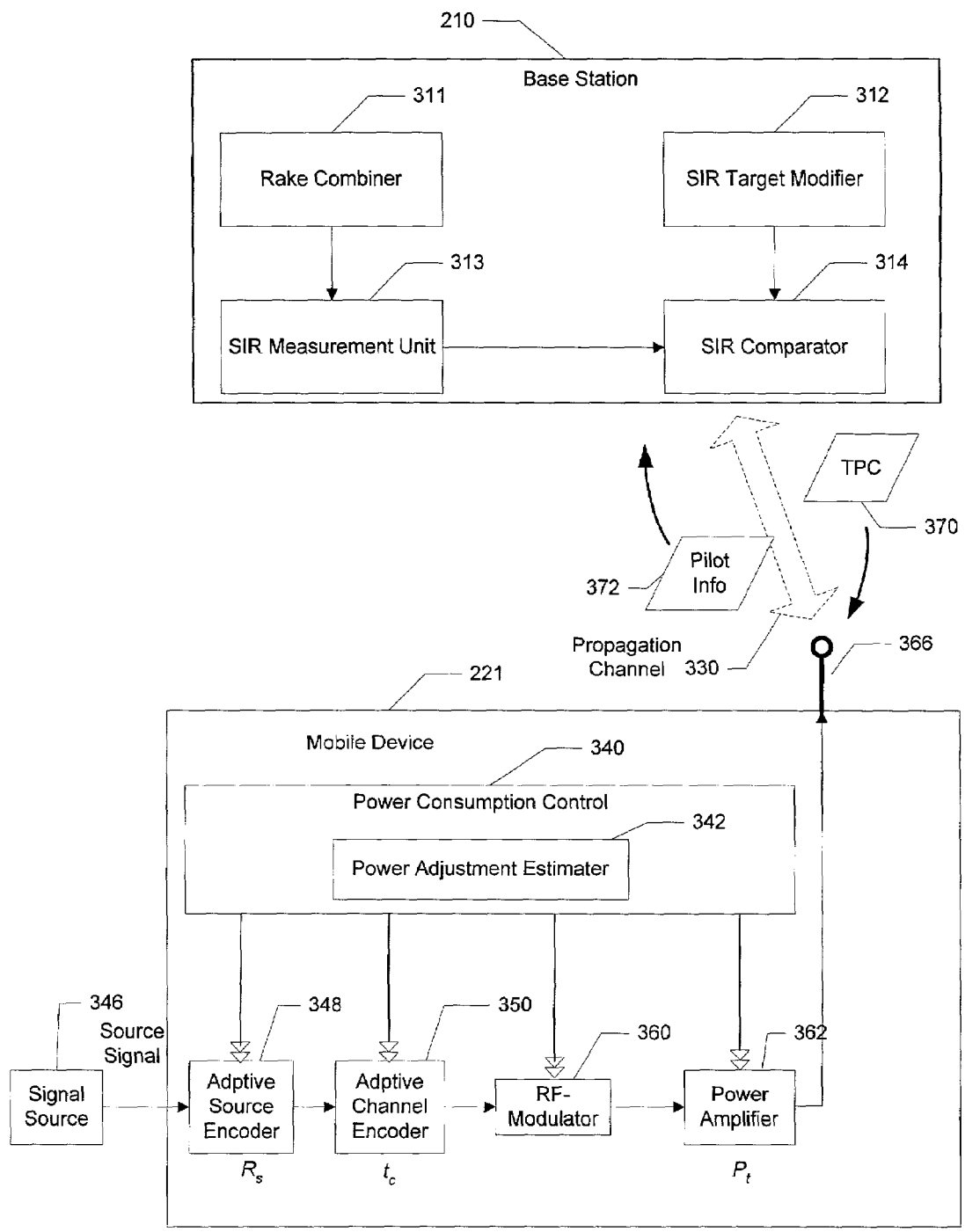
FIG. 3 is a schematic diagram showing an embodiment of a system implementing the control scheme of invention for minimizing power consumption of mobile devices.

As shown in FIG. 3, the base station 210 and the mobile device 221 are linked by a wireless propagation channel 231. The mobile device 211 includes an input source 346 for inputting multimedia signals. The input source may be, for example, a video camera with a built-in microphone. A source encoder 348 encodes the input signals to form source-coded data, which are then encoded by the channel coder 350. The data coded by the channel data are radio frequency (RF) modulated by the RF modulator 360. The output signals of the RF modulator 360 are then amplified by a power amplifier 362 for transmission through an antenna 366.

In the illustrated embodiment, the mobile device 221 employs a bit allocation algorithm, in which source coding and channel coding are inter-dependently operated and adapted for the type of input signals, dynamic wireless channel conditions, and various QoS requirements for the wireless transmission. The source encoder 348 is responsible for encoding input source signals, such as, images, video/audio signals, and text signals, to appropriately remove a portion of redundant signals in source signals, and generating an output source encoded signal. With respect to different types of source signals, the source encoder may implement separate coding algorithms. For example, for an inputting video signal, a complexity-scalable Motion Estimation (ME) algorithm is preferably used. For an inputting image signal, a Set Partitioning in Hierarchical Trees (SPIHT) algorithm may be used. The channel encoder 350 further processes the source-encoded data by adding protection data to the source-coded data based on, for example, the Reed-Solomon algorithm.

The source and channel encoders are preferably not only adaptive to the input source signals but also to the dynamic wireless channel conditions. For example, when the wireless channel is in a "good" condition (i.e., the channel is stable and less noisy, and the error rate is low and signal-interference ratio is high), the source encoder may introduce large transmission rate, and the channel encoder may use less protection symbols. On the other hand, in a case when the wireless channel is in a "bad" condition, the channel encoder may apply more protection to the data. This change of error protection causes the mobile device to send a pilot information packet 372 to the base station The mobile device 221 is powered by a portable power source 368, which is typically a battery pack but may be other type of power sources, such as a fuel cell. The total power consumption of the mobile device includes power used for the source and channel coding operations and the power for transmitting RF-modulated signals representing the encoded data. Since the power source has a limited amount of energy stored therein, it is important to minimize the total power consumption to extend the service life of the power source. As explained below, the power consumption control component 340 is responsible for achieving the minimum power consumption in the mobile device by tuning the operation parameters of each functional module in the mobile device.

The base station 210 has a plurality of functional blocks, including a rake combiner 311, a SIR measurement unit 313, a SIR comparator 314, and a SIR target modifier 312. The rake combiner 311 detects signals transmitted from the mobile devices in the cell of the base station, including the mobile device 221. The SIR measurement component 313 measures a signal-to-interference ratio (SIR) for the received wireless transmission of each of the mobile devices by analyzing the output signal of the rake combiner 311. The SIR target modifier 312 sets SIR targets for the mobile devices to maximize the effective total transmission rate of the system under the constraints of SIR limits set by quality of service (QoS) requirements of the mobile devices and a limit on the total effective received power. The modification is performed in response to the receipt of the pilot information packet 372. SIR comparator 314 compares the measured SIR for each mobile device with the SIR target for that device and generates a Transmit Power Control (TPC) signal for instructing the mobile device to increase or decrease it transmission power. If the measured SIR is higher than its corresponding SIR target, the TPC signal is set to "1." Otherwise, the TPC signal is set to "0".

Figure 4:
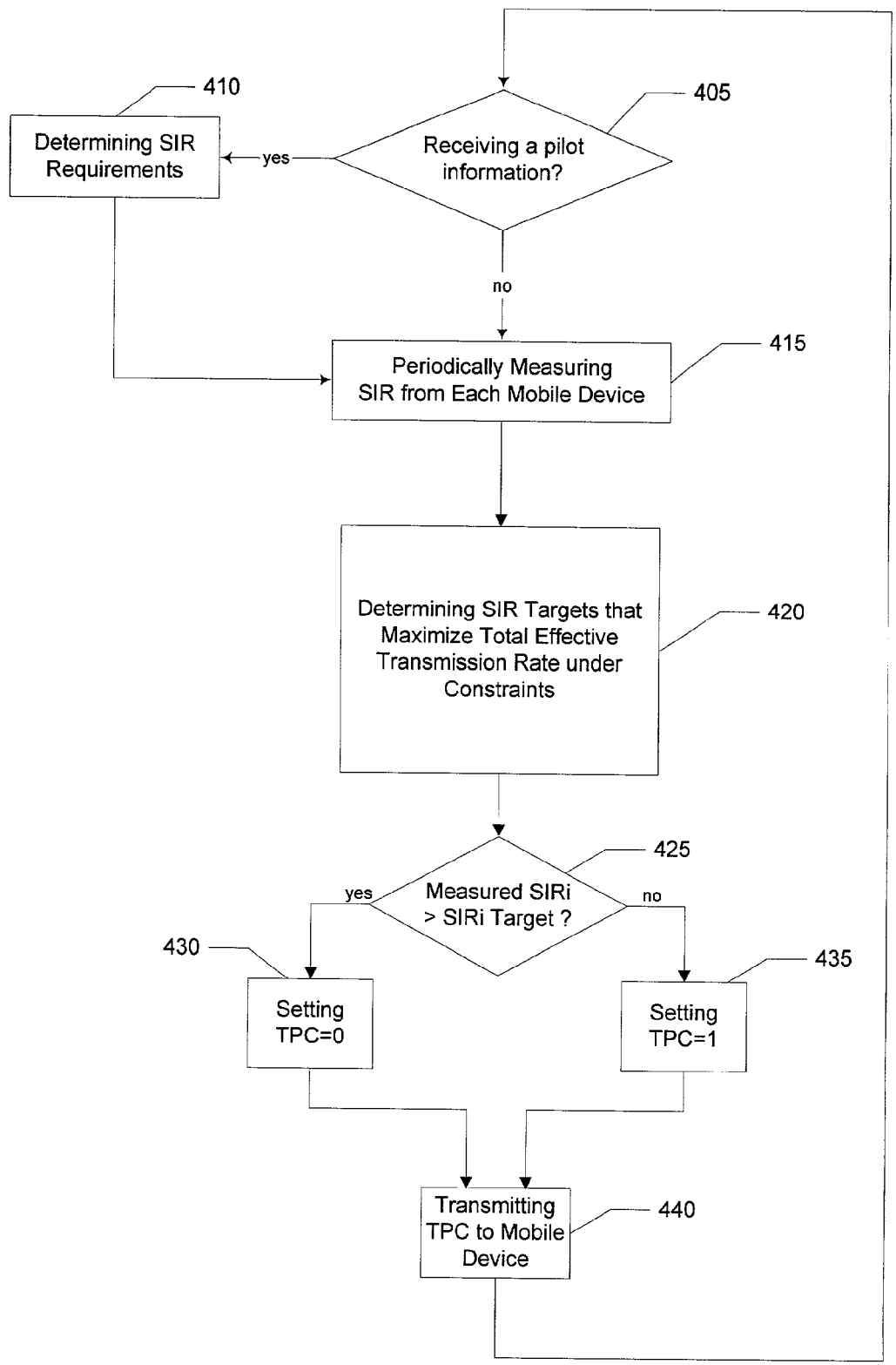
FIG. 4 is a flow chart showing the steps executed by the base station in the embodiment of FIG. 3 for controlling transmission power of the mobile devices.

Referring now to the flowchart of FIG. 4, starting at step 405, it is determined whether a pilot information packet from a mobile device is received. In this regard, when the mobile device first registers with the base station it sends pilot information 372 (FIG. 3) to the base station. The pilot information includes the error protection level requested by the mobile device. The mobile device also sends pilot information packets during the course of communication with the base station when its required error protection level is changed. Upon receiving the pilot information (step 405), the SIR target modifier 312 derives a minimum required SIR for that mobile device from the requested error protection level (step 410). During the communications with the base station, the mobile device may change its requested error protection level with the base station, resulting a pilot information, and the base station will update the minimum required SIR for the device. As described in greater detail below, the minimum required SIRs for the mobile devices become part of the constrains for the SIR target modifier 312 in determining the SIR targets for the mobile devices for maximizing the total effective transmission rate of the system.

To control the transmission power of the mobile devices in its wireless cell, the base station periodically measures the SIR for each mobile device from the received data transmitted by that mobile device (step 415). The base station also determines a SIR target for each of the mobile devices. The SIR targets for the mobile devices are selected to maximize the total effective transmission rate of the system under the constraints of the minimum SIRs for the mobile devices and the limit on the total received power (step 420). The base station periodically (e.g., every 0.666 ms for W-CDMA case) compares the measured SIR for each mobile device with respective SIR target (step 425). According to the comparison result, a TPC signal is set. In particular, if the measured SIR is less than the SIR target, then TPC is set to "0" (step 430), indicating that the mobile device needs to increase its transmission power. An increase in the transmission power tends to lead to a higher measured SIR. On the other hand, if the measured SIR is greater than the SIR target, the TPC is set to "1" (step 435), indicating that the mobile device needs to decrease its transmission power. The TPC signal is sent to the mobile device (step 440). Accurate long-range channel predictions can be performed at the base station to inform the mobile device of the predicted channel conditions. In addition, the information of average interference caused by other mobile devices in the same cell is transmitted to each mobile device for its optimization of power consumption.

Figure 5:
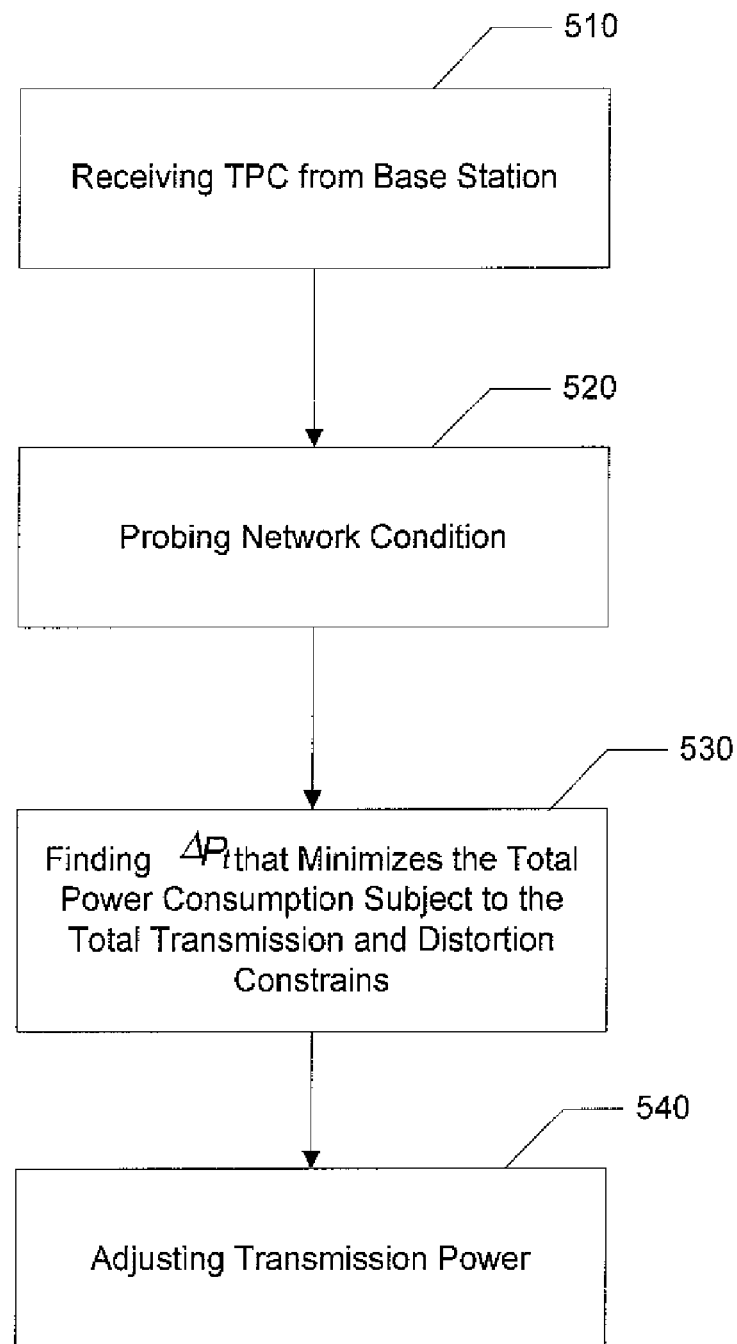
FIG. 5 is a flow chart showing the steps executed by the mobile device in the embodiment of FIG. 3 for minimizing its total power consumption.

Referring now to FIG. 5, when the mobile device receives the TPC signal transmitted from the base station (step 510), it probes the current wireless channel condition (step 520), which is characterized by the bit error rate (BER) in a preferred embodiment. To that end, each mobile station measures an SIR value for its wireless link with the base station. The measured SIP value is then converted to BER according to Equation 8a described below. The BER reflects the fluctuation of the wireless channel conditions. The current channel condition is a parameter for determining the proper channel coding to be used. The BER allows the mobile device to analyze the relationship between transmission rate and distortion on the source side and the channel distortion after applying certain error protection level. The mobile device then determines the amount of adjustment to the transmission power (step 530). The amount of adjustment is determined by solving a minimization problem in which the total power consumption of the mobile device to be minimized under the constraints of maintaining the total tolerable distortion and the maximal transmission rate below pre-selected limits that may be determined by the conditions of the wireless network. The solution to this minimization problem provides a new operation state of the mobile device that may have different parameters for the source coding, channel coding, and transmission operations, resulting in a new distribution of power consumption among these three components that has the lowest power consumption value available under the given constraints. The parameters may include, for instance, the transmission bit energy, the source coding rate, the channel coding rate, etc. The difference between the current transmission power level and the estimated transmission power level of the minimization solution is the amount of adjustment for the transmission power. The mobile device then adjusts its transmission power as well as its source coding and channel coding, so as to minimize its total power consumption (step 540).

When the calculated amount of adjustment to the transmission power is valid (i.e., within a reasonable range) and non-zero, the mobile device changes its transmission power by that amount. This adjustment also includes implementing the bit reallocation between the source coding and channel coding according to the result of the minimization calculation. When there is a change in the error protection level associated with this adjustment, the mobile device sends a pilot information packet comprising the desired error protection level to the SIR target modifier 312 at the base station. As a consequence, the base station modifies the SIR lower limit for each mobile device.

Theoretic Framework

To facilitate a clear understanding of the invention, the theoretic framework of the present invention is described below by way of example using an embodiment in which the input signals for the mobile device include video signals and the source coding includes motion estimation. It will be appreciated, however, the power control scheme of the invention is not limited to any particular type of input signals.

Total Power Consumption at Mobile Device

Wireless System Configuration

As an exemplary application, assuming the wireless system comprises a plurality of wireless network cells, each of which is able to map the entire service area. The cell comprises a base station and a set of mobile devices in communication with the base station. The base station provides video signals, which complying H.26L protocol, to the mobile devices. Accordingly, the base station and the mobile devices are configured for H.26L protocol, and preferably employ a bit allocation algorithm for available bits distribution. In particular, at mobile devices, the source encoders employ Motion Estimation (ME) algorithm for source signal encoding, and the channel encoders use Reed-Solomon (RS) algorithm for channel encoding. The RF-modulator and power amplifier apply standard techniques therein.

The operational state of each functional module may be characterized by an operation parameter, thus, the operational state of the mobile device may be described by a vector, represented by m as m $(R_s, k_c, P_t)$. $R_s$ is the source coding rate, which represents the number of bits per second at the adaptive source encoder. $k_c$ is the error protection level, which represents the number of protection symbols in the error coding block with respect to the Reed-Solomon model at the adaptive channel encoder. $P_t$ represents the transmission signal power. In keeping with the invention, the functional modules operate in coordination with each other, therefore, operational parameters are covariant.

The operational state of the mobile system is adaptively set according to the wireless channel condition, QoS requirements, and resource limitations. The channel condition is characterized by Bit Error Rate b. The QoS requirement for each mobile device is described by the base station as a SIR lower limit $\gamma^l$, and at each mobile device it is represented by total tolerable distortion $D_0$. The resource limitation of the base station is associated with the summation of maximal transmission power available at each mobile device, which is represented by $Q_T$, and the resource limitation at each mobile device is associated with the maximal transmission rate $R_0$.

Total Power Consumption at Mobile Device

The total power consumption, hereafter represented by $P_{total}$, comprises source encoding power consumption $P_s$, channel encoding power consumption $P_c$, and data transmission power consumptions $P_{trans}$, which proportions to the transmission signal power $P_t$ by an inverse efficiency coefficient $\eta$. Therefore, the total power consumption at mobile device may be expressed as:

$$P_{total} = P_s + P_c + P_{trans} \qquad \text{(Equation 1)}$$

Because the operational states of the source encoder, channel encoder and the power amplifier are mutually dependent, the power consumptions at these functional modules are covariant. For example, changing of $P_{trans}$ results changing of $P_s$ and $P_c$. In minimizing the total power consumption, QoS requirement for each mobile device and resource limitations of the mobile devices are guaranteed. In the embodiment of the invention, the QoS requirement specifies that the total distortion is lower than a predetermined value, $$D_{total} \leq D_0 \qquad \text{(Equation 2)}$$

where $D_{total}$ is the total distortion, and $D_0$ is the predetermined distortion value. The resource limitation specifies:

$$R_{total} \leq R_0 \qquad \text{(Equation 3)}$$

where $R_{total}$ is the total rate including the source coding rate and channel coding rate, and $R_0$ is the predetermined value. In the embodiment, the source coding power consumption is a function of source coding rate $R_s$, the channel coding power consumption is a function of channel coding rate $R_c$, and the power amplifier power consumption is a function of the energy for transmitting a bit $\epsilon_b$ and the transmission rate $R_{tran}$, which is summation of the source and channel coding rates. Then the minimization of the total power consumption problem may be expressed as:

$$\min_{\{\Delta P_t, R_s, R_c, \epsilon_b\}} P_{total}(P_s(R_s) + P_c(R_c) + P_{trans}(P_t(\epsilon_b, R_s + R_c)))$$

subject to:

$$R_{total} \leq R_0, \text{ and } D_{total} \leq D_0 \qquad \text{(Equation 4)}$$

where $\Delta P$ is the amount of adjustment for the transmission signal power $P_t$. The mobile control unit receives TPC every $T_p$=0.666 ms, and adjusts the transmission power accordingly, that is:

$$P_t(t) = P_t(t - T_p) \pm \Delta P \qquad \text{(Equation 5)}$$

Assuming that current operational state of the mobile device is:

$$m_{current} = \{R_s(t - T_p), t_c(t - T_p), P_t(t - T_p)\} \qquad \text{(Equation 6)}$$

Current channel condition is $b_{current}$. Current QoS requirements are upper cut-off distortion $D_0$, lower cut-off SIR $\gamma_I^l$, i=1, 2, . . . N. Current resource limitations are total transmission power of all mobile devices is $Q_T$, and total transmission rate is $R_T$. Upon receiving TPC, the transmission signal power at the mobile device is changed from $P_t(t-T_p)$ to $P_t = P_t(t-T_p) \pm \Delta P$. Suppose after the adjustment of the transmission power, the operational state of the mobile device is $$m = \{R_s, t_c, P_t\} \qquad \text{(Equation 7)}$$

New channel condition changes to $b_{new}$, whereas the QoS requirements and resource limitations keep the same. The $b_{new}$ may be expressed as:

$$b_{new}=g(\Delta P, b_{old}) \quad \text{(Equation 8)}$$

The function g in equation 8 may be obtained by combining the following formulas and sequentially eliminating the variables of SIR, $P_r$, and $P_t$, where $P_r$ is the received power at the base station:

$$b_{new}^i = \frac{1}{2}\left[1 - \frac{1}{\sqrt{1+\frac{1}{SIR^i}}}\right] \quad \text{(equation 8a)}$$

$$SIR^i = \frac{p_r^i}{\sum_{j=1}^{n} p_r^j + \eta} \quad \text{(equation 8b)}$$

$$p_r^i = \frac{p_t^i}{(4\pi df/c)^\alpha} \quad \text{(equation 8c)}$$

$$p_t^i = p_t^i(t-T_p) \pm \Delta p \quad \text{(equation 8d)}$$

In equations 8b, η is the noise power received by the base station, the noise may come from the interference of the neighboring cells, or the channel fluctuation. $p_r^i$ is the received power from the ith mobile device by the base station. In equation 8c, $p_t^i$ is the transmitted power at the ith mobile device, d is the distance between the ith mobile device and the base station, f is the communication frequency the ith mobile device is using, c is the speed of light, and α is a scaling factor with typical value of 1.5.

Transmission Power Consumption:

With changing of the transmission power, the energy for transmitting a bit, that is bit energy represented by $\epsilon_b$ may be empirically obtained from the historical data, and then $$\epsilon_b = h(\Delta p) \quad \text{(Equation 9)}.$$

Therefore, transmission power consumption may be deduced as:

$$P_{trans} = \epsilon_b \times R_{trans} = h(\Delta p) \times (R_s + R_c), \quad \text{(Equation 10)}$$

wherein $R_s$ and $R_c$ are source coding rate and channel coding rate, respectively. In practice, power amplifier delivers more power than the required $P_{trans}$ due to the operation efficiency, which is characterized by $\eta(P_{trans})$ and may be expressed as:

$$\eta(P_{trans}) = P_{trans}/P_{amp} \quad \text{(Equation 11)},$$

where $P_{amp}$ is the real power delivered by the power amplifier. Thus, the power consumption at the power amplifier can be expressed as:

$$P_{amp} = h(\Delta p) \times (R_s + R_c)/\eta \quad \text{(Equation 12)}$$

In the embodiment, a typical value of η is 50%

Source Encoder Power Consumption

On the video coding side, when a more complex compression algorithm is used, the more processing power will be consumed, and meanwhile, a shorter bit stream can be generated. The relationship between rate and processing power can be represented as $P_s = rp_s(R_s)$. As for the source coding power consumption $P_s$, it has shown that the most complex and power consuming portion is the Motion Estimator (ME). To adjust the power consumption in the source encoder, a partial-distortion-measure based hierarchical block motion estimation algorithm is adopted to provide several power consumption levels with different Mean Square Error (MSE). Hierarchical Partial Distortion Search (HPDS) algorithm selects candidate motion vectors hierarchy by hierarchy using different partial distortion functions as matching criteria for different hierarchies of the search. The algorithm refines the search by selecting more candidate motion vectors for lower hierarchies while using lower decimation ratios' partial distortions for higher hierarchies. It can be divided into following steps:

step 1) for a given sub-sampling parameter $S_1$, the decimated block of present frame was compared with each block within the search window of previous frame. Thus, $n_1$ motion vectors were selected as candidates for next step;

step 2) for another sub-sample parameters $S_2$, repeat step 1 within all candidates $n_1$ and then select $n_2$ candidates for step 3; and step 3) based on step 2, full sampling matching is executed among $n_2$ candidates to get the optional motion vector as the result.

According to above steps, different combinations of ($S_1$, $n_1$, $S_2$, $n_2$) define different source power levels, while the combination of ($S_1$, $n_1$, $S_2$, $n_2$) depends at least in part, on the For a frame having M×N blocks, each of which has 16×16 size. Then, the total power consumption of the ME in a frame may be obtained as:

$$P_{s,ME} = M \times N \times P_{s,block} \quad \text{(Equation 13)}$$

where $P_{s,block}$ is the power consumed in a block matching process, which can be further expressed as:

$$P_{s,block} = T_s \times P_{sub} + T_a \times P_{add} \quad \text{(Equation 14)}$$

where $T_s$ and $T_a$ are the number of absolute difference operations and addition operations, respectively, and $P_{sub}$, $P_{add}$ are the energy consumed for an absolute difference and an addition operation, respectively. The number of the absolute difference operations $T_s$, and the number of the addition operations $T_a$, depend on the ME algorithm being used. In the example, they are related to the ($S_1$, $n_1$, $S_2$, $n_2$) in HPDS, which may then be expressed as:

$$T_s = \frac{256}{S_1} \times (2W+1)^2 + \frac{256}{S_2} \times n_1 + 256 \times n_2, \text{ and} \quad \text{(equation 15)}$$

$$T_a = T_s - (n_1 + n_2) - (2W+1)^2$$

where W is the size of the searching window and is known. Combining equations 10, 11, and 12, the power consumption of the ME in a frame may be expressed as:

$$P_{s,ME} = \quad \text{(equation 16)}$$
$$M \times N \times \left\{\left[\frac{256}{S_1} \times (2W+1)^2 + \frac{256}{S_2} \times n_1 + 256 \times n_2\right] \times \right.$$
$$P_{sub} + \left[\frac{256}{S_1} \times (2W+1)^2 + \frac{256}{S_2} \times n_1 + \right.$$
$$\left.\left. 256 \times n_2 - (n_1+n_2) - (2W+1)^2\right] \times P_{add}\right\}$$

Equation 16 can be simply expressed as:

$$P_s = rp_s(R_s) \quad \text{(Equation 17)}$$

Channel Encoder Power Consumption:

To efficiently deliver high quality compressed bitstreams, which are extremely sensitive to transmission errors, it is natural to add some error protections to the compressed bitstreams. It is known that different portions of compressed bitstreams have different importance to the quality of the reconstructed video after decoding the compressed video stream. Therefore, Unequal Error Protection (UEP) technique is appropriate for error protection. Based on the syntax of H.26L, which is the protocol used in the example for encoding/decoding the video signal, the header bits of the bitstreams are much more important than the following textual bits. Thus, a group of macroblocks's header bits are put together as the Most Significant Portion (MSP) class, whereas, the textual bits of those macroblocks are grouped together as the Least Significant Portion (LSP) class. Then different channel protections are applied to different classes. More specifically, higher protection is applied to the MSP class. The channel encoder in the example employs RS algorithm, which is represented by RS(n,k), where k is the number of source symbols, and n-k is the number of protection symbols that is able to protect 2(n-k) source symbols. In general, n is selected such that $n=2^m-1$, where m is the number of bits per symbol.

Regarding to the power consumption at the ME employed channel encoder, it is associated with the error correction level. The energy consumption of a bit-parallel RS encoder architecture provides:

$$\epsilon_{rsenc}(t) = 2t(2^m - 1 - 2t)(\epsilon_{gfmult} + \epsilon_{gfadd})/\text{codeword} \quad \text{(Equation 18)}$$

where the energy model for calculating adder $\epsilon_{gfadd}$, multiplier $\epsilon_{gfmult}$, and inverse $\epsilon_{gfinv}$ blocks over Galois Filed (GF($2^m$)) are well known in prior art. Fr example, a real-delay gate-level MED method gives that:

$$\epsilon_{gfadd} = 3.3 \times 10^{-5} \, m \, (mW/MHz)$$

$$\epsilon_{gfmult} = 3.7 \times 10^{-5} \, m^3 (mW/MHz)$$

In equation 18, t is defined as t=(n-k)/2, representing the number of source symbols protected by (n-k) protection symbols. It can be seen from equation 18 that the power consumption for the channel coding is related to the error protection. Representing the MSP bit rate of H.26L source bit stream by $R_{s,m}$ and the error protection level by $t_m$, while the LSP bit rate by $R_{s,l}$, and the error protection by $t_l$, then the total channel coding power consumption may be expressed as:

$$P_c = P_{c,MSP}(R_{s,m}, t_{s,m}) + P_{c,LSP}(R_{s,l}, t_{s,l}) \quad \text{(equation 19)}$$

$$= \frac{R_{s,m}}{n - 2t_m} \times \varepsilon_{rsenc}(t_m) + \frac{R_{s,l}}{n - 2t_l} \times \varepsilon_{rsenc}(t_l)$$

Combining equations 12, 17, and 19, the total power consumption represented by equation 3, at the mobile device can be expressed as a function of ΔP.

According to the invention, minimization the total power consumption is associated with QoS requirement, characterized by total distortion, and resource limitation, characterized by total transmission rate constrain.

End-to-end Distortion

The expected end-to-end distortion, represented by $D_{total}$, has two major contributions, source distortion $D_s$, and channel distortion $D_c$. The source distortion is resulted from the searching steps in ME algorithm and video rate control, while the channel distortion is caused by the channel transmission error. By applying a standard analysis procedure, the expected end-to-end distortion can be obtained as:

$$D_{total} = D_s(S_1, n_1, S_2, n_2, R_s) + \quad \text{(equation 20)}$$

$$\sum_{i=1}^{N_{msp}} p_{fail}(i) \times D_c(i) + \sum_{j=1}^{N_{lsp}} p_{fail}(i) \times D_c(j)$$

where $N_{msp}$ is the number of blocks in MSP, $N_{lsp}$ is the number of blocks in LSP, $P_{fail}$ is the failure probability of the ith block, and $D_c(i)$ is the channel distortion caused by the failure of the ith block. The failure probability can be further expressed as:

$$p_{fail}(t) = \sum_{j=t+1}^{n} \binom{n}{j} b_{sym}^j (1 - b_{sym})^{n-j}, \text{ wherein} \quad \text{(equation 21)}$$

$$b_{sym} = 1 - (1 - b_{curr})^m$$

wherein $b_{curr}$ is the current bit error rate of the channel condition, and can be calculated from the SIR from equation 8a.

Total Power Consumption Minimization

With the total power consumption expressed by equation 3, the working states of the source/channel encoder and the power amplifier may be adjusted to achieve a minimized total power consumption. The working states may be adjusted by tuning, for example, the ME searching parameters, source rate, channel rate, and the transmission bit energy. In minimizing the total power consumption, QoS requirement and resource limitations need to be satisfied. Thus, the object power minimization problem may be expressed as:

$$\min_{\{(S_1, n_1, S_2, n_2), R_s, R_c, P_{trans}\}} \{P_s[(S_1, n_1, S_2, n_2), R_s] + \quad \text{(equation 22)}$$

$$P_c(R_s, R_c, b_{curr}, \varepsilon_b) + P_{trans}[P_t(\varepsilon_b, (R_s + R_c)]\}$$

$$s.t. \; D_{total} \leq D_0 \text{ and } R_s + R_c \leq R_0$$

One approach to solve equation 22 is to apply a centralized algorithm, which considers all users' statistics simultaneously. This approach does not require any iterative steps for achieving the optimum, however, it needs large computational complexity and brings high communication overhead. An alternative approach is distributed solution that deals with N-dimensional minimization problem by using an iterative, one-dimensional (1-D) search algorithm, in which optimization is performed along each user's target SIR iteratively until reaching the maximum. This approach may decrease the complexity of solving this optimization problem and proceed in a distributed way. It may only achieve local optimal or sub optimal sets of the N-dimensional space.

Total Effective Transmission Rate Maximization at Base Station

For the following description, it is assumed that the wireless network cell of the base station includes N mobile devices, that the base station and the mobile devices are configured for video source signals, and that the source encoders and channel encoders at mobile devices employ ME and RS algorithms, respectively. Assume further that at time t, the mobile device 221 in FIG. 2 sends a pilot information comprising a new error protection level characterized by parameter k in Reed-Solomon channel coding algorithm. In response to the pilot information transmitted from the mobile device, the base station resets the SIR lower limit for the mobile device. Unlike in mobile device, in which the total power consumption is minimized, the base station maximizes its effective total transmission rate in order to provide service to as many as possible mobile devices while still keeping appropriate QoS requirements and resource limitations.

The total effective transmission rate, represented by $R_T$, is defined as summation of all effective data rates at wireless channels, each of which may be represented by $R_T^i$. Thus, it can be expressed that:

$$R_T = \sum_{i=1}^{N} R_T^i. \qquad \text{(Equation 23)}$$

The effective data rate $R_T^i$ at each channel is defined as the data rate $R^i$ multiplied by the wireless channel capacity $C^i$, that is:

$$R_T^i = C^i \times R^i \qquad \text{(Equation 24).}$$

In equation 22, the capacity $C^i$ is defined as the maximum number of mobile devices $N_0$ per network cell relative to spreading factor pg that is proportional to the inverse of channel data rate $R^i$, and $C^i$ is a function of $\epsilon_b/I_0$ and may be defined by wireless system with different physical characteristics, such as modulation scheme. For example, $C^i$ may be expressed as:

$$C = \frac{N_0}{pg} = \frac{N_0}{\left(\frac{(\epsilon_b/I_0)}{R^i}\right) \times f} \qquad \text{(Equation 25)}$$

where $f$ is a constant function associated with the distribution function of the received signal power, for example, the Gaussian distribution function, $\epsilon_b/I_0$ is a constant representing the fluctuation of the wireless network channel, thereby, being associated with the probability of failure of transmitting a bit through the channel. $\epsilon_b/I_0$ can be further expressed as: $(\epsilon_b/I_0)^i = SIR^i \times W^i/R^i$. Therefore, combining equations 23, 24, and 25, it can be obtained that:

$$R_T = \qquad \text{(Equation 26)}$$

$$\sum_{i=1}^{N} R_T^i = \sum_{i=1}^{N} R^i \times C^i(\epsilon_b/I_0) = \sum_{i=1}^{N} R^i \times C^i(SIR^i \times W^i/R^i)$$

where $W^i$ is the maximum transmission power of the mobile device, $SIR^i$ is the Signal-to-Interference-Ratio that can be calculated as:

$$SIR^i = \frac{Q^i}{\sum_{j=1}^{N} Q_j^i + \eta} \qquad \text{(Equation 27)}$$

where $\eta$ is the noise received by the base station, and $Q^i$ is the received signal power from the ith mobile device, thereby, $C^i$ can be calculated depending on, for example, the data modulation method being used.

Combining equation 26 and 27, the total effective transmission rate $R_T$ may be obtained, and with received signal power $Q^i$ from each mobile device as variables, $R_T$ can be maximized by selecting appropriate $Q^i$ for each mobile device. According to the invention, the maximization is subject to the QoS requirement of SIR and the resource limitation of Q.

The SIR requirement specifies that, $$SIR^1 = \gamma^1, SIR^j \geq \gamma^j, j = 2, \ldots N \qquad \text{(Equation 28)}$$

where $\gamma^j$ is the original $SIR^j$ target before resting, $SIR^1$ and $\gamma^1$ are the new SIR target and the original SIR target for the mobile device MS1 who sent the pilot information. $\gamma^1$ can be calculated from the combination of following two equations.

$$b_{new}^j = \frac{1}{2}\left[1 - \frac{1}{\sqrt{1 + \frac{1}{\gamma_{new}^i}}}\right] \qquad \text{(Equation 29)}$$

$$\sum_{j=t+1}^{n} \binom{n}{j} b_{new}^j \times (1 - b_{new}^j)^{n-j} = b_{old}^j \qquad \text{(Equation 30)}$$

In addition to the SIR requirement, resource limitation in terms of the maximum transmission power of each mobile device is also considered as:

$$\sum_{j=1}^{N} Q^j \leq Q_T = \sum_{j=1}^{N} Q_T^i, \qquad \text{(Equation 31)}$$

where $Q_T^i$ is the maximum transmission power of ith mobile device. Combining equations 24, 26, and 28, the objective maximization problem can be developed as:

$$\max_{\{Q^1, Q^2, Q^N\}} R_T \text{ subject to} \qquad \text{(Equation 32)}$$

$$SIR^j \geq \gamma^j, j = 2, \ldots N, \text{ and } \sum_{j=1}^{N} Q^j \leq Q_T = \sum_{j=1}^{N} Q_T^i.$$

By solving equation 32, using for example, Gradient projection method, or Feasible Directions (FD) method, $\{Q^1, Q^2, \ldots Q^N\}$ can be obtained. Then from the definition equation 25, the SIR targets for each mobile device are calculated.

It will be appreciated by those of skill in the art that a new and useful method and system of controlling power consumption in wireless mobile devices has been described herein. In view of the many possible embodiments to which the principles of this invention may be applied, however, it should be recognized that the embodiments described herein with respect to the drawing figures are meant to be illustrative only and should not be taken as limiting the scope of invention. For example, those of skill in the art will recognize that the illustrated embodiments can be modified in arrangement and detail without departing from the spirit of the invention. Although the invention is described in terms of software modules or components, those skilled in the art will recognize that such may be equivalently replaced by hardware components. Therefore, the invention as described herein contemplates all such embodiments as may come within the scope of the following claims and equivalents thereof.

What is claimed is:

1. A computer-readable medium having computer-executable instructions for performing steps of a power control scheme for network communications between a base station and a plurality of mobile devices, the steps comprising:
    setting, by the base station, a target signal quality value for each of the mobile devices through a constrained maximization calculation to maximize a total effective data rate of wireless transmissions from the mobile devices;
    periodically deriving, by the base station a measured value of a signal quality parameter for each mobile device based on transmissions received from said each mobile device;
    comparing, by the base station, the measured values of the signal quality parameter for said each mobile device to the target signal quality value for said each mobile device;
    transmitting, by the base station, an instruction signal to said each mobile device to adjust a transmission power of said each mobile device;
    determining, by said each mobile device in response to the instruction signal from the base station, an amount of adjustment to a transmission power of said each mobile device based on a constrained minimization calculation to minimize a total power consumption of said each mobile device via a reallocation of power among the transmission power and coding components of the total power consumption; and
    adjusting, by said each mobile device, the transmission power by said amount of adjustment in conjunction with the reallocation of power to the coding components of the total power consumption, and,
    wherein the reallocation of power results in a changed error protection level of said each mobile device, the computer-readable medium including further computer-executable instructions for said each mobile device to send an information packet to the base station specifying the changed error protection level of said each mobile device.

2. A The computer-readable medium of claim 1, wherein the signal quality parameter is a signal-interference ratio.

3. A The computer-readable medium of claim 1, wherein the coding components include a source coding component and a channel coding component, and the reallocation of power includes changing bit rates of source coding and channel coding and adjusting transmission bit energy.

4. A The computer-readable medium of claim 1, wherein the constrained maximization calculation maximizes the total effective data rate under constraints imposed by a total received transmission power and error protection levels specified by the mobile devices.

5. A The computer-readable medium of claim 1, wherein the constrained minimization calculation minimizes the total power consumption of said each mobile device under constraints imposed by a total data distortion level and a maximum transmission rate of said each mobile device.

6. The computer-readable medium as in claim 1, wherein the base station repeats the step of setting based on the changed error protection level of said each mobile device.

7. The computer-readable medium of claim 1, wherein the step of determining by said each mobile device includes deriving a bit error rate from wireless transmissions received from the base station.

8. A computer network comprising:
    a base station;
    a plurality of mobile devices communicating with the base stations by wireless transmissions, the base station being programmed to perform to set a target signal quality value for each of the mobile devices through a constrained maximization calculation to maximize a total effective data rate of wireless transmissions from the mobile devices, periodically derive a measured value of a signal quality parameter for each mobile device based on transmissions received from said each mobile device, compare the measured values of the signal quality parameter for said each mobile device to the target signal quality value for said each mobile device, and transmit an instruction signal to said each mobile device to adjust a transmission power of said each mobile device;
    said each mobile device being programmed to determine, in response to the instruction signal from the base station, an amount of adjustment to a transmission power of said each mobile device based on a constrained minimization calculation to minimize a total power consumption of said each mobile device via a reallocation of power among the transmission power and coding components of the total power consumption, and adjust the transmission power by said amount of adjustment in conjunction with the reallocation of power to the coding components of the total power consumption; and,
    wherein the reallocation of power results in a changed error protection level of said each mobile device, and wherein said each mobile device is programmed to send an information packet to the base station specifying the changed error protection level of said each mobile device.

9. The computer network of claim 8, wherein the signal quality parameter is a signal-interference ratio.

10. The computer network of claim 8, wherein the coding components include a source coding component and a channel coding component, and the reallocation of power includes changing bit rates of source coding and channel coding.

11. The computer network of claim 8, wherein the constrained maximization calculation maximizes the total effective data rate under constraints imposed by a total received transmission power and error protection levels specified by the mobile devices.

12. The computer network of claim 8, wherein the constrained minimization calculation minimizes the total power consumption of said each mobile device under constraints imposed by a total data distortion level and a maximum transmission rate of said each mobile device.

13. The computer network as in claim 8, wherein the base station resets the target values of the signal quality parameter for the mobile devices based on the changed error protection level of said each mobile device.

14. The computer network of claim 8, wherein said each mobile device derives a bit error rate from wireless transmissions received from the base station for determining the amount of adjustment to the transmission power thereof.

15. A computer readable medium having computer-executable instructions for a mobile device to perform a method of power control for network communications, the method comprising:
   receiving an instruction signal to adjust a transmission power of the mobile device;
   determining an amount of adjustment to the transmission power of the mobile device based on a constrained minimization calculation to minimize a total power consumption of the mobile device via a reallocation of power among transmission power and coding components of the total power consumption;
   adjusting the transmission power of the mobile device by the amount of adjustment in conjunction with the reallocation of power to the coding components of the total power consumption; and,
   wherein the reallocation of power results in a changed error protection level of the mobile device, and wherein the method further comprises sending an information packet to a base station specifying the changed error protection level of the mobile device.

16. The computer-readable medium of claim 15, wherein the coding components comprise a source coding component and a channel coding component, and wherein the reallocation of power comprises changing bit rates of source coding and channel coding and adjusting transmission bit energy.

17. The computer-readable medium of claim 15, wherein the constrained minimization calculation minimizes the total power consumption of the mobile device under constraints imposed by a total data distortion level and a maximum transmission rate of the mobile device.

18. The computer-readable medium as in claim 15, wherein determining comprises deriving a bit error rate from wireless transmissions received from the base station.

* * * * *